United States Patent [19]

Balland

[11] Patent Number: 5,440,445
[45] Date of Patent: Aug. 8, 1995

[54] HIGH-ENERGY IGNITION GENERATOR IN PARTICULAR FOR A GAS TURBINE

[75] Inventor: Patrick G. A. Balland, Rueil-Malmaison, France

[73] Assignee: Eyquem, Nanterre Cedex, France

[21] Appl. No.: 115,709

[22] Filed: Sep. 3, 1993

[30] Foreign Application Priority Data

Sep. 4, 1992 [FR] France ............... 92 10603

[51] Int. Cl.$^6$ ............................................ F23Q 3/00
[52] U.S. Cl. ............................... 361/257; 361/247
[58] Field of Search ....... 315/209 T, 209 M, 209 CD; 361/247, 253, 256, 257

[56] References Cited

U.S. PATENT DOCUMENTS

| | | | |
|---|---|---|---|
| 4,739,185 | 4/1988 | Lee et al. | 307/106 |
| 4,983,886 | 1/1991 | Balland | 315/209 CD |
| 5,138,622 | 8/1992 | Friede et al. | 372/38 |

FOREIGN PATENT DOCUMENTS

| | | |
|---|---|---|
| 0463800 | 1/1992 | European Pat. Off. |
| 1493392 | 9/1966 | France. |
| 2636678 | 3/1990 | France. |
| 1808737 | 6/1969 | Germany. |

OTHER PUBLICATIONS

Patent Abstracts of Japan, vol. 15, No. 155 (M-1104) 18 Apr. 1991 & JP-A-30 26 872 (Hanshin Electric Co., Ltd.); Publication No. JP3026872, 5 May 1991, 'Capacitor Electric Discharge Type Igniter'.

*Primary Examiner*—Jeffrey A. Gaffin
*Attorney, Agent, or Firm*—Wenderoth, Lind & Ponack

[57] ABSTRACT

A low-energy circuit and a high-energy circuit are operatively coupled in parallel between an energy source and an igniter. The low-energy circuit is for igniting the igniter to generate sparks between electrodes of the igniter, and the high-energy circuit is for characterizing an energy of the sparks generated between the electrodes of the igniter. A spark detector detects a presence of a spark between the electrodes of the igniter, and a control circuit enables an operation of the high-energy circuit only upon detection of the presence of a spark between the electrodes of the igniter by the spark detector.

6 Claims, 1 Drawing Sheet

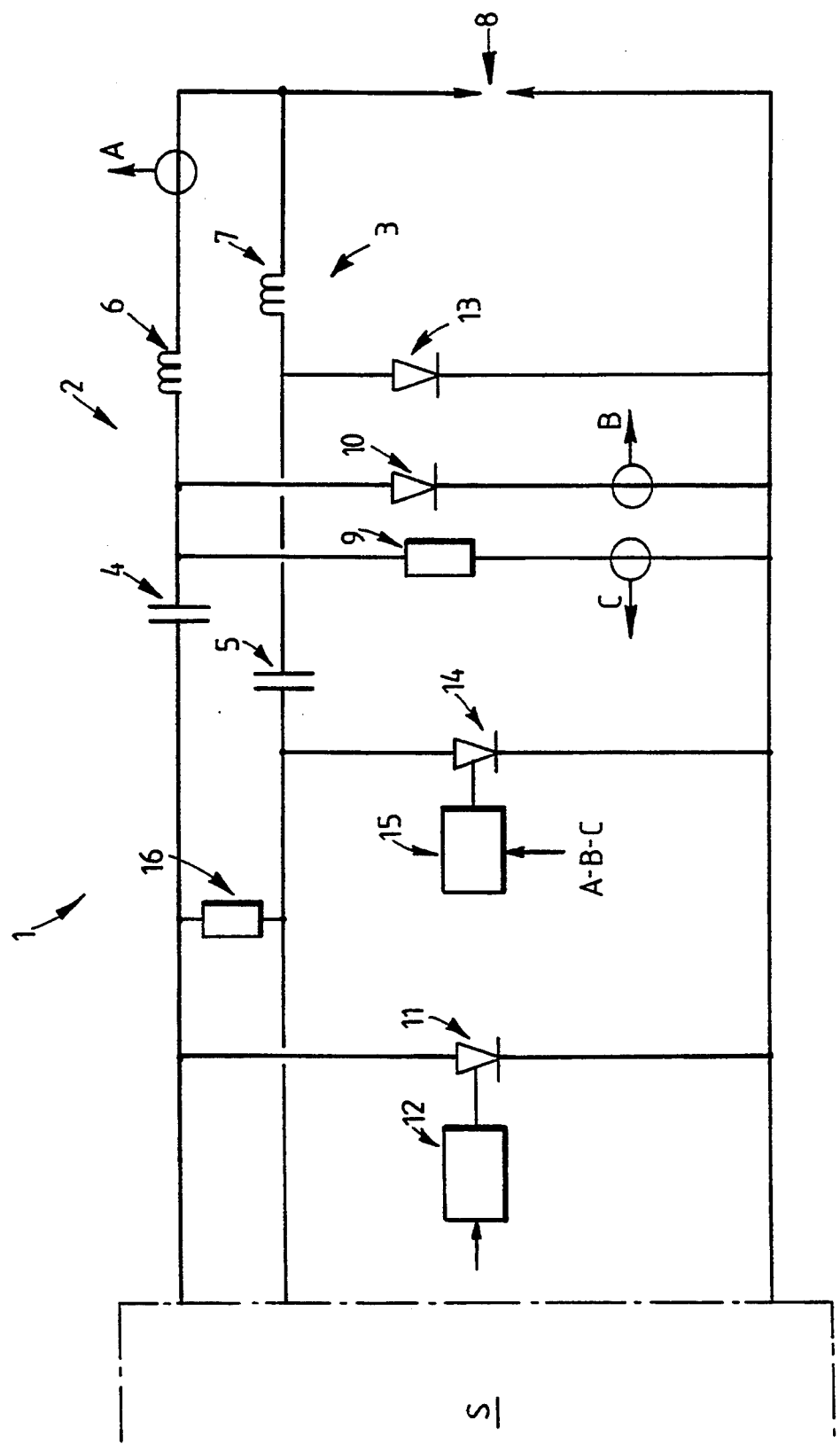

HIGH-ENERGY IGNITION GENERATOR IN PARTICULAR FOR A GAS TURBINE

BACKGROUND OF THE INVENTION

1. Field of the Invention

The present invention relates to a high-energy ignition generator in particular for a gas turbine.

2. Description of the Related Art

A number of high-energy ignition generators are already known in the art. Such generators include an energy source coupled to a device for generating sparks between the electrodes of an igniter, for example a low-voltage igniter with a semiconductor air gap.

Typically, these generators include a circuit including an energy storage capacitor and an inductor in series with the igniter, a freewheel diode connected in parallel to the terminals of the inductor and the igniter and a mechanism for short-circuiting the circuit, so as to generate sparks between the electrodes of the igniter.

The short-circuiting mechanism may consist of a discharger formed for example by a gas tube, which fulfills the function of a power circuit breaker and voltage reference.

However, the short-circuiting mechanism may also consist of semiconductor switching members controlled by a B circuit for comparing the voltage at the terminals of the storage capacitor with a reference voltage.

For more detailed information relating to the structure and operation of this type of generator, reference may be made for example to document FR-A-2,636,678 in the name of Labo Industrie.

However, generators of this type have a certain number of drawbacks as regards to the energy transmitted to the igniter in the event of failure to ignite the spark between its electrodes.

Indeed, in the event of failure to ignite a spark for any reason, such as wear on the igniter, all the energy stored in the generation circuit is transmitted to the igniter, and in particular to its semiconductor, which causes additional damage of greater or lesser extent to this semiconductor and premature wearing of the igniter.

Document DE-A-1,808,737 describes a spark ignition device which comprises two circuit parts which are adapted to cause the appearance of two successive sparks between the electrodes of the igniter in order to guarantee ignition.

However, this device also has the drawbacks mentioned previously of damaging the igniter in the event of failure to ignite a spark.

SUMMARY OF THE INVENTION

The object of the invention is therefore to solve the above-discussed conventional drawbacks by providing an ignition generator which is simple, reliable and which makes it possible to limit the damage to the igniter in the event of failure to ignite a spark, and to improve the quality thereof.

As previously indicated, reference may be made to document FR-A-2,636,678 for a complete description of the structure and the operation of one embodiment of a high-energy ignition generator to which the present invention may be applied.

It is known that, typically, such a generator includes an energy source connected to means for generating sparks between the electrodes of an igniter.

In the aforementioned document, the spark generation means include a circuit including an energy storage capacitor and an inductor which are connected in series with the igniter.

A freewheel diode and a discharge resistor are connected in parallel to the terminals of the inductor and of the igniter.

Finally, short-circuiting means, consisting in this document of semiconductor switching members, are connected in parallel to the terminals of this circuit in order to cause, by short-circuiting this circuit, the generation of sparks between the electrodes of the igniter.

Such a structure has the various drawbacks mentioned previously with respect to damaging the igniter in the event of failure to ignite a spark.

To overcome such drawbacks, the subject of the invention is a high-energy ignition generator in particular for a gas turbine, of the type including an energy source connected to circuitry for generating sparks between the electrodes of an igniter, characterized in that the generation circuitry includes two parts, a first low-energy part, for igniting the sparks between the electrodes of the igniter, and a second high-energy part, for characterizing the energy of the sparks, and a device for controlling the operation of the second part of the generation circuitry, connected to a detector for detecting whether or not a spark has been ignited between the electrodes of the igniter, in order to enable the operation of this second part only in the event of ignition of a spark.

BRIEF DESCRIPTION OF THE DRAWING

The invention will be better understood with the aid of the following description which is given solely by way of example and is made with reference to the attached drawing which represents a block diagram illustrating the operation of a generator according to the invention.

DETAILED DESCRIPTION OF THE PREFERRED EMBODIMENT

In the generator according to the invention, the generation means includes two parts, a first low-energy part, for igniting the spark between the electrodes of the igniter, and a second high-energy part, for characterizing the energy of the spark, and means for controlling the operation of the second part of these generation means, connected to means for detecting whether or not a spark has been ignited between the electrodes of the igniter, in order to enable the operation of this second part of these generation means only in the event of ignition of a spark.

The principle of operation of the generator according to the invention is based on the observation of the fact that the ignition of a spark may be obtained with a low energy, independently of the characterization of its energy, that is to say of the energy of this spark proper.

It is then possible to differentiate between the ignition phase of the spark and the phase of characterization of its energy.

Each part of generation means may the include the various elements mentioned previously, namely an energy storage capacitor, an inductor, a freewheel diode, a discharge resistor and short-circuiting means, for example semiconductor short-circuiting means.

However, the dimensioning of the elements of each part of these generation means is adapted to the function of ignition or characterization of the energy of the spark, which is fulfilled by each part.

Thus, for example, the first part for igniting the sparks may include a low-capacitance capacitor, making it possible to limit the energy transmitted to the igniter during ignition, which reduces the damage to this igniter in the event of failure to ignite a spark, and the current through the short-circuiting means, which has a significant advantage when the latter are semiconductor devices.

Moreover, the inductor of this part of he generation means may also have a low induction in order to promote ignition of the spark.

The elements of the other part of these generation means may have conventional values making it possible to characterize the energy of the spark in a manner which is known in the state of the art.

Reference is made to the attached drawing. It may actually be seen that the generation means designated by the general reference 1 in this figure are connected to an energy source S and comprise two parts in parallel, designated by the general references 2 and 3.

Each part comprises an energy source storage capacitor 4, 5 and an inductor 6,7 in series. These two parts in parallel are connected to one electrode of an igniter 8.

The first part 2 of these means includes a discharge resistor 8 and a freewheel diode 10 which are connected up in parallel between the point midway between the energy storage capacitor 4 and the inductor 6, and the other electrode of the igniter.

Moreover, this part 2 also includes short-circuiting means designated by the general reference 11 in this figure, and consisting for example of a set of semiconductor switching members, in order-to short circuit this first part under the control of control means 12 receiving a triggering signal.

This signal is for example delivered by means for comparing the voltage at the terminals of the capacitor 4 with a reference value.

The second part of these generation means also incudes a freewheel diode 13 connected up between the point midway between the energy storage capacitor 5 and the inductor 7, and the other terminal of the igniter 8.

The second part of these means also includes short-circuiting means designated by the general reference 14, also consisting for example of semiconductor switching members, whose operation is triggered by control means 15 connected to means for detecting whether or not a spark has been ignited between the electrodes of the igniter, in order to enable operation of this second part of the generation means only in the event of ignition of a spark between the electrodes of the igniter, and therefore to apply a high characterization energy between the electrodes of the latter only when the spark is ignited, in order not to damage the igniter in the event of non-ignition of the spark.

The means for detecting whether or not a spark has been ignited may consist of conventional means for measuring the current flowing through the branch containing the capacitor 4 and the inductor 6 of the first part of these means, for example at A.

It is indeed known that if a given current is flowing here, the spark is ignited between the electrodes of the igniter.

This detection can also be performed by measuring the return current flowing at B through the freewheel diode 10 of the first part of the generation means. Indeed a return current flows through this freewheel diode when the spark is ignited.

Finally, according to another embodiment, this detection can also be achieved b the detection at C of the flow of a given current through the discharge resistor 9 of this part.

It is indeed known that when a spark is ignited between the electrodes of the igniter, no current flows through this discharge resistor.

If a current flows through this discharge resistor, it is therefore possible to conclude that the spark is not ignited, in order to inhibit the triggering of this second part of the generation means in order not to send corresponding energy to the igniter.

Obviously, other embodiments of these means for detecting whether or not the spark has been ignited between the electrodes of the igniter may be envisaged.

However, in any case, these detection mans deliver enabling or inhibition information to the control means 15 of the short-circuiting means 14 of the second part of the generation means, in order to enable or inhibit their operation, so as to transmit or not transmit to the igniter energy for characterizing the spark, according to whether or not a spark is already ignited between the electrode of the igniter.

It will also be noted that this second part of the generation means includes a discharge resistor 16 connected between the connection terminals of the short-circuiting means 11 and 14 of the two parts of these means, to the corresponding capacitors, this discharge resistor making it possible for the storage capacitor 5 of the second part to discharge through the first part, in order not to maintain a full voltage at the terminals of the short-circuiting means in the event of failure to ignite a spark.

It is indeed known that semiconductor switching members such as thyristors withstand a full voltage relatively poorly when they are heated to a high temperature, as is the case in the type of applications envisaged.

This discharge resistor therefore makes it possible to limit the application of this full voltage and to reduce heating of these members.

It is therefore seen that the operation of the generator according to the invention includes a plurality of steps, namely:

triggering of the ignition of a spark between the electrodes of the igniter by triggering the short-circuiting means of the first low-energy part of these generation means; and in the event of ignition of this spark, the triggering of the short-circuiting means of the second high energy part of the generation means, in order to characterize this spark, by transmitting high energy in a conventional manner.

This splitting of the functions allows splitting of the corresponding means, which makes it possible to optimize their dimensioning in order to improve the quality of the spark.

I claim:

1. A high-energy ignition generator comprising:
    an energy source;
    an igniter having electrodes;
    a low-energy circuit, operatively coupled to said energy source and said igniter, for igniting said igniter so as to generate sparks between said electrodes of said igniter;
    a high-energy circuit, operatively coupled to said energy source and said igniter, for characterizing an energy of the sparks generated between said electrodes of said igniter;

spark detection means for detecting a presence of a spark between said electrodes of said igniter;

a control circuit, operatively coupled to said high-energy circuit and said spark detection means, for enabling an operation of said high-energy circuit only upon detection of the presence of a spark between said electrodes of said igniter by said spark detection means.

2. A high-energy generator as claimed in claim 1, wherein each of said low-energy circuit and said high-energy circuit includes a series circuit of an energy storage capacitor and an inductor coupled between said energy source and one electrode of said igniter, and wherein each further includes a freewheel diode, a discharge resistor and a short-circuiting device coupled to said series circuit.

3. A high-energy generator as claimed in claim 2, wherein said discharge resistor of said high-energy circuit is coupled to said series circuit of said low-energy circuit.

4. A high-energy generator as claimed in claim 1, wherein said spark detecting means comprises a current measuring device which measures a current flow in said series circuit of said low-energy circuit.

5. A high-energy generator as claimed in claim 1, wherein said spark detecting means comprises a current measuring device which measures a current flow in said freewheel diode of said low-energy circuit.

6. A high-energy generator as claimed in claim 1, wherein said spark detecting means comprises a current measuring device which measures a current flow in said discharge resistor of said low-energy circuit.

* * * * *